United States Patent
Miyagawa

[15] 3,650,190
[45] Mar. 21, 1972

[54] CAMERA HAVING BUILT-IN SOCKET FOR FLASHCUBES OR OTHER FLASH APPARATUS

[72] Inventor: Fumihiro Miyagawa, Tokyo, Japan
[73] Assignee: Kabushiki Kaisha Ricoh, Tokyo, Japan
[22] Filed: June 18, 1969
[21] Appl. No.: 834,393

[30] Foreign Application Priority Data

June 20, 1968 Japan...................................43/52035

[52] U.S. Cl. ...........................................................95/11 R
[51] Int. Cl. .........................................................G03b 19/00
[58] Field of Search...........................................95/11, 11.5

[56] References Cited

UNITED STATES PATENTS 3,286,612  11/1966  Lieser.......................................95/11

Primary Examiner—Samuel S. Matthews
Assistant Examiner—Kenneth C. Hutchison
Attorney—Burgess, Ryan and Hicks

[57] ABSTRACT

A camera having a built-in flash synchronization socket for flashcubes in which a post disposed at the center of said socket for guiding the insertion of the flashcubes into the socket comprises two electrically insulated outer and inner tubes so that a connector of a flash cord or cable of an ordinary type flashbulb holder may be electrically connected to said two tubes which in turn are electrically connected to a flash synchronization switch operable in response to the shutter operation. Not only the flashcubes but also ordinary large-sized flashbulbs may be used.

4 Claims, 4 Drawing Figures

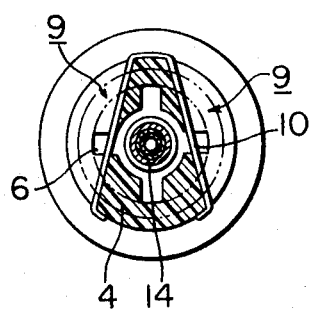
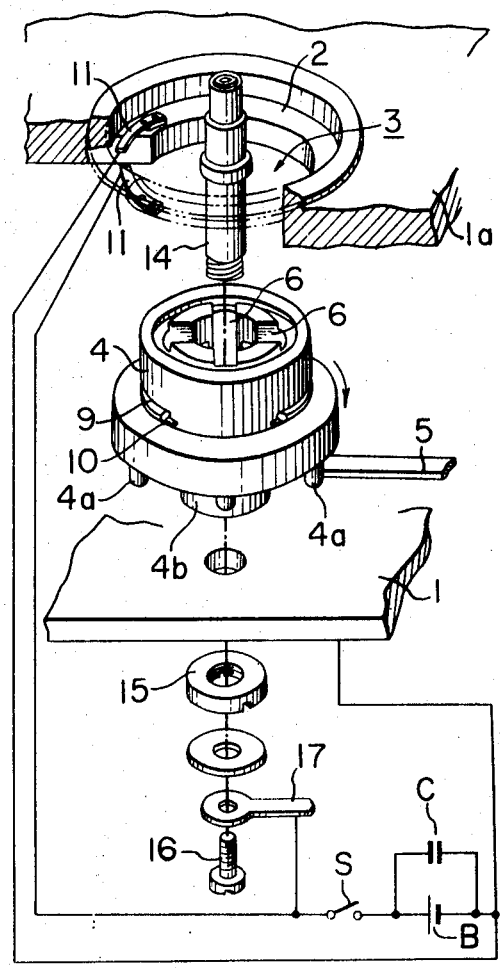

INVENTOR
FUMIHIRO MIYAGAWA
BY Burgess, Ryan + Hicks
ATTORNEYS

CAMERA HAVING BUILT-IN SOCKET FOR FLASHCUBES OR OTHER FLASH APPARATUS

BACKGROUND OF THE INVENTION

The present invention relates generally to a camera capable of flash-photography with flashcubes and more specifically a camera capable of flash-photography not only with the flashcubes but also with other ordinary flashbulbs or flash equipment.

Flashcubes are well known in the art, having four small-sized flash lamps equiangularly disposed about the axis of a tubular post or plug extending from the undersurface of a housing having four transparent surfaces. Known is a camera of the type in which the flashcube unit is rotated through 90° in response to the advancement of one picture frame of film so that only that one of the flash lamps which is directed toward a subject may be flashed in suitable synchronization with the shutter operation. Some types of the flashcubes have the housing with the configuration of a cylinder so that it may be not appropriate to call them "flashcubes," but for clarity of the description of the present invention, it is to be understood that the term "flashcubes" includes the cylindrical flash lamp holders of the type in which a plurality of flash lamps are rotatably disposed in a cylindrical housing substantially in the same manner and for the same purpose as in the case of "flashcubes."

The above described flashcubes offer advantages in quick continuous flash-photography. However, since the flash lamps incorporated in the cubes are relatively small-sized, the intensity of illumination obtained by this flash lamp is sometimes not sufficient so that the distance to a subject is inevitably limited in the case of a camera having a lens of an ordinary aperture. Therefore, the flash-photography range may be extended when various types of other flash lamps be employed selectively as required by providing a built-in flash synchronization socket at a suitable position of the camera so that a flash cable or cord extending from the flash holder other than the flashcube may be electrically connected thereto. This is possible when the camera has a flash synchronization mechanism adapted to be used in flash photographing both with flashcubes and with other flash lamps. However, two types of flash synchronization sockets must be built into the camera for this purpose so that the construction becomes complicated and the exterior appearance is adversely affected.

The primary object of the present invention is therefore to provide a camera which can use not only flashcubes but also other types of flash lamps or equipment, thus eliminating the defects as described hereinabove.

SUMMARY OF THE INVENTION

In brief, according to the present invention, a center guide post of the socket built into the camera for engaging with the post extending from the undersurface of the flashcube is so arranged as to be used as a connector to be coupled with a connector of a flash cable or cord extending from a holder for ordinary flash lamps or equipment.

According to one embodiment of the present invention, the connector in the built-in socket comprises two outer and inner metallic tubes whose one end each is respectively electrically connected to the terminals of a flash synchronization switch and a battery while the other end each is connected to the connector of the flash cable or cord of the ordinary type flash holder or the flash equipment.

The above and other objects, features, and advantages of the present invention will become more apparent from the following description of the illustrative embodiment thereof taken in conjunction with the accompanying drawings.

BRIEF DESCRIPTION OF THE DRAWINGS

FIG. 1 is an exploded view of one embodiment of a socket according to the present invention;

FIG. 4 is a sectional view only of a socket along the chain line X—X of FIG. 3.

DESCRIPTION OF THE PREFERRED EMBODIMENT

Figure 2:
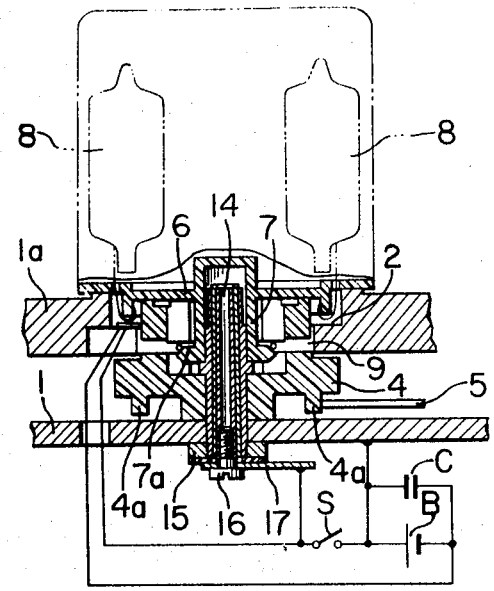
FIG. 2 is a longitudinal sectional view thereof built into a camera with a flashcube unit being attached thereto.

A plate 1a is formed integral with an upper shelf plate 1 in a camera body in vertically spaced apart relation with the upper shelf plate 1. The upper decorative cover of the camera may be used as the plate 1a, but since the plate 1a must have a considerable thickness, it is preferable that the decorative cover, made of a thin metal plate, is superposed upon the plate 1a. An opening 3 having a stepped portion 2 formed along the inner surface thereof is formed through the plate 1a (See FIG. 1) and is adapted to receive from below a cylindrical socket 4 having a flange and a bottom. The socket 4 is loosely fitted within the opening 3 coaxially thereof. A hub 4b extending from the bottom of the socket 4 is fixed to the upper surface of the plate 1. Four short pins 4a are depending from the bottom of the socket 4 so as to enclose the hub 4b. An engaging member 5 disposed upwardly of the plate 1 as adapted to engage with the four depending pins 4a and function just like a pulldown claw of a cine-camera or projector in synchronism with the advancement of the film loaded in the camera. Thus, whenever each new picture frame of the film is advanced to its photographing position, the socket 4 is rotated about its axis through 90° so that a new flash bulb within the flashcube is rotated to its flash position.

Four longitudinal grooves 6 are formed in the inner surface of the thick wall of the socket 4 for engagement with respective equiangularly formed projections 7a of an tubular shaft 7 for attachment of the flashcube to the camera so that the flash bulbs 8 in the flashcube may be positioned in a predetermined relation with the socket 4. As shown in FIG. 4, two slots 9 are formed in the cylindrical wall of the socket 4 at substantially mid-height thereof. A hairpin shaped spring 10 is interposed between the uncut walls left between the slots 9 across the longitudinal grooves 6. Therefore, when the tubular shaft 7 of the flashcube is inserted into the socket 4, the projections 7a formed around the tubular shaft 7 expand the spring 10 outwardly and then are inserted further below the spring 10 so that the flashcube may be prevented from being pulled out of the socket 4. However, when the cube is forced upwardly, the projections 7a may open the spring 10 so that the flashcube may be detached from the socket 4 when required.

As shown in FIG. 1, a pair of contact elements 11 are disposed in electrically insulated relation with each other at the stepped portion of the opening 3 for contact with a pair of filament contacts of a flash bulb within the flashcube which is located in the front or flash position. The pair of contact elements 11 are electrically connected to a charging circuit built in the camera through a flash synchronization switch S which is operated in synchronism with the shutter release operation.

Figure 3:
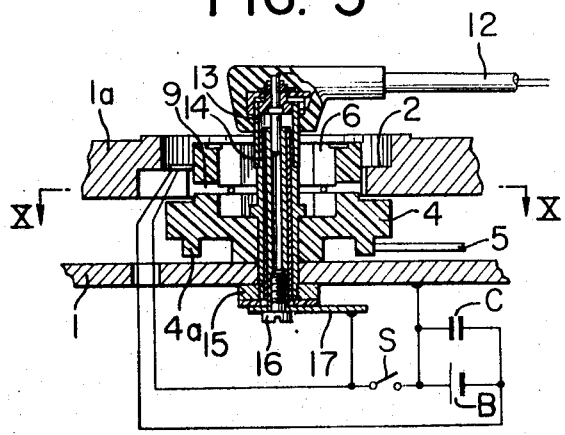
FIG. 3 is a longitudinal sectional view thereof with a flash synchronizing cable being attached thereto instead of a flashcube.

In the conventional socket of the type described, only one integral pole is extending upwardly from the center of the bottom plate of the socket so as to serve as the guide for inserting the tubular shaft or post 7 of the flashcube. According to the present invention, instead of the above described guide post, a terminal post 14 comprising two electrically insulated tubular members is provided and a terminal 13 for flash cable 12 (see FIG. 3) extending from a flash holder attached to an accessory of the camera may be fitted over this terminal post 14. The terminal post 14 extends through the opening of the socket 4 and is fixed to the plate 1.

The terminal or plug 13 and the terminal post 14 must have the constructions and dimensions as specified in Japanese Industrial Standard (JIS No. B7102, 1961), "Sockets and plugs for synchronous flashing mechanism of cameras." Therefore, their constructions and functions are well known to those skilled in the art so that no detailed description will be made in this specification. According to JIS, a power source is generally incorporated in a flash holder from which the flash cable 12 is extended while the terminal post 14 is only connected to a shutter-operation-responsive flash synchronization switch. However, as described above according to the present invention, the charging circuit for the flashcube is incorporated in the camera, and the present invention has been described with particular reference to the embodiment which can use ordinary type flash lamps or bulbs in addition to the flashcube. The outer metallic tube of the terminal post 14 is securely fixed to plate 1 by means of nut 15 so as to be grounded, that is, connected to one electrode of the power source. The inner metallic tube has a metallic terminal element 17 fixed thereto by means of a screw 16, and this element 17 is electrically connected to one terminal of the flash synchronization switch S as shown in FIG. 1. In this arrangement, it is not necessary to incorporate the power source in the flash holder which is to be attached to the exterior of the camera and which includes the flash cable 12.

I claim:

1. A camera for flash photography comprising a camera housing;
   a first plate mounted within said housing;
   a second plate spaced from said first plate and having a fixed connection thereto;
   a circular walled surface having an opening formed in said second plate;
   electrical contact means associated with said walled surface;
   an electrical power source located within said camera housing and electrically connected to said contact means;
   a socket element coaxially fitted within said opening, said socket element having a plurality of internally formed grooves therein adapted to selectively receive projecting means of a flashcube unit that simultaneously is in contact with said contact means; and
   terminal means extending from said first plate through said socket to said second plate and projecting beyond said second plate to form a post adapted to selectively receive a flash lamp cable fitted thereover, said terminal means having a circuit connection with said power source.

2. A camera according to claim 1 in which said walled surface of said opening is formed as an internal circular step, and the contact means is located on said step.

3. A camera according to claim 1 in which said socket is rotatable, a lever is connected therewith, and said socket with an included flashcube unit therein is rotated 90° by said lever with each photography exposure.

4. A camera according to claim 1 in which said terminal means comprises a metal tube having two electrically insulated metal tubes connected respectively to opposite sides of said power source.

* * * * *